United States Patent [19]
Tremblay

[11] 3,949,837
[45] Apr. 13, 1976

[54] SELF-CENTERING LUBRICATING TOOL

[76] Inventor: Theodore C. Tremblay, 7 Page Road, Bedford, Mass. 01730

[22] Filed: Feb. 11, 1974

[21] Appl. No.: 441,058

[52] U.S. Cl. .............................. 184/105 R; 308/93
[51] Int. Cl.² ....................................... F01M 11/04
[58] Field of Search ................. 184/1 D, 105 R; 141/383–386, 391, 311, 392; 308/93; 188/71.6; 137/246.1 Z; 403/36–39; 273/73 E; 285/324, 94

[56] References Cited
UNITED STATES PATENTS

| | | | |
|---|---|---|---|
| 2,187,608 | 1/1940 | Kropp | 184/1 D |
| 2,427,456 | 9/1947 | Hoy | 285/94 X |
| 3,305,281 | 2/1967 | Dumpis | 403/36 X |
| 3,346,072 | 10/1967 | Erdos | 184/1 D |
| 3,365,024 | 1/1968 | Freda | 184/1 D |

FOREIGN PATENTS OR APPLICATIONS 170,174    10/1921    United Kingdom................. 308/93

Primary Examiner—Richard C. Pinkham
Assistant Examiner—William R. Browne

[57] ABSTRACT

Self-centering lubricating tool for lubricating bearings on vehicles equipped with disk brakes. The tool has a lubricating channel leading from the free end surface of the annular base member to the free end surface of the frusto-conical shaped member. The annular base member and the frusto conical shaped member abutt each other. Each member has a recess therein and a common internal ledge.

7 Claims, 4 Drawing Figures

SELF-CENTERING LUBRICATING TOOL

BACKGROUND OF INVENTION

This invention relates to a lubricating device used to lubricate the inner front wheel bearings on vehicles equipped with disk brakes. On vehicles equipped with disk brakes, the inner wheel bearing is not readily accessible. The calipers, the brake assembly, including the disk pads and rotors, must be disassembled for periodic lubrication of the inner and outer bearings. This disassembly and reassembly process requires a substantial amount of mechanic labor and is therefore time consuming and expensive.

The lubricating tool of this invention eliminates the disassembly of the complete brake system. By removing only the outer wheel bearing and attaching the novel lubricating device to the wheel spindle so that the lubricating tool abuts against the outer hub, a seal between the lubricating device and the outer hub is formed. The lubrication device is equipped with a grease fitting so that grease can be pumped into a channel in the lubricating device, through the tool, and on into the hub assembly. When pressure builds up, the grease flows along the spindle to the inner bearing thus completing the lubrication of the inner bearing without disassembling the brake mechanism.

DESCRIPTION OF THE PRIOR ART

The most pertinent prior art appears to be found in U.S. Pat. No. 2,514,799 issued on July 11, 1950, to L. Rubertino et al. This patent discloses a lubricating device for front wheel bearings. However, this device existed before the wide-spread use of disk brakes on motor vehicles. A prior art device consists of two parts and is not readily adaptable to different size spindles as is the novel lubricating tool of this invention.

Other prior art patents considered in the preparation of this application are U.S. Pat. Nos. 2,655,230; 3,124,216; 3,158,227; 3,318,424; 3,469,655 and 3,724,596. To the extent necessary, the above publications are incorporated herein by reference.

SUMMARY OF THE INVENTION

In general the lubricating device comprises an open-ended frusto-conical member adapted to fit over the spindle of a vehicular axle. The member is provided with a lubricant passageway adapted to carry grease from the large diameter end of the member to the small diameter end of the member. A grease fitting is connected to the passageway opening at the large diameter end of the member. The member may be provided with one or more annular ledges or shoulders in the interior thereof.

DETAILED DESCRIPTION

Figure 1:
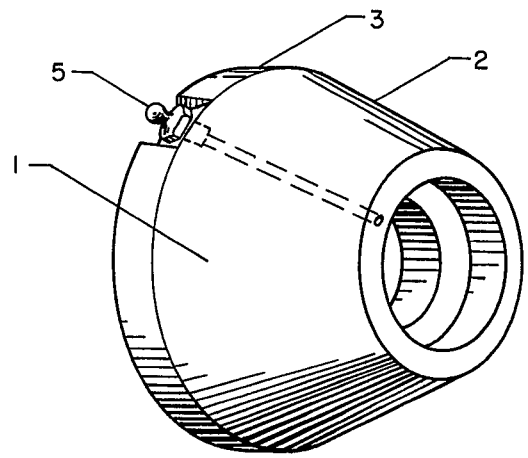
FIG. 1 shows a perspective view of the novel lubricating device.

Referring now to the drawings, FIG. 1 shows a perspective view of a preferred embodiment of the lubricating device 1 having a frusto-conical section 2, an annular base 3 and a grease fitting 5, attached in operational relationship to the device. The annular base may preferably be knurled for ease of handling.

Figure 2:
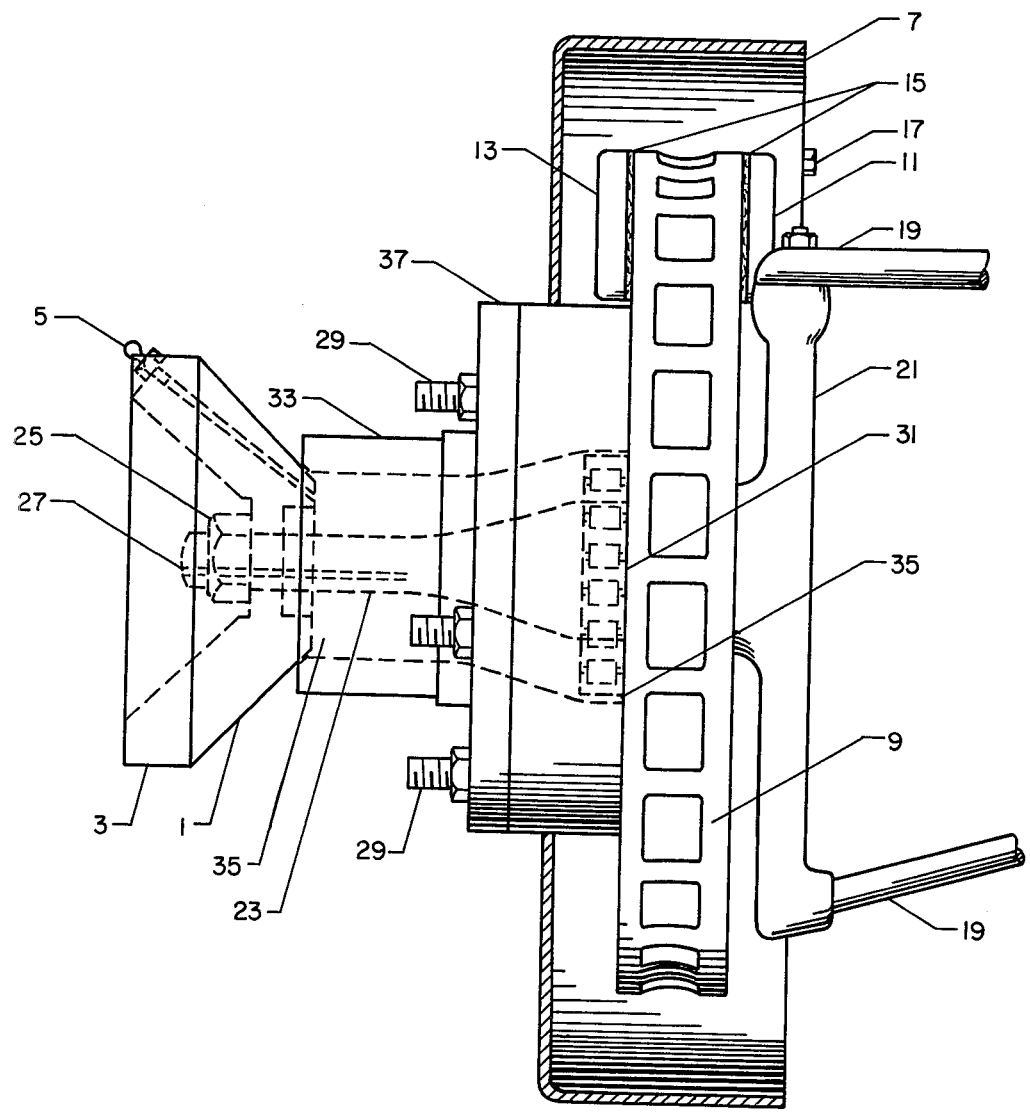
FIG. 2 shows the lubricating tool in place and ready for use on the hub of the vehicle equipped with disk type brakes.

FIG. 2 shows the lubricating tool 1 in operational relationship with a wheel hub 37 on a vehicle equipped with disk type brakes. It is to be understood that the disk brake mechanism shown in FIG. 2 is for illustrative purposes only and the lubricating tool can in general be used with all disk brake mechanisms. For other disk brake designs, see for example, U.S. Pat. Nos. 2,655,230; 3,318,424 and 3,584,708. The lubricating tool of this invention is designed such that it is universal and can be used on most of the vehicles now equipped with disk brakes.

The exterior conical shape of the tool is critical in two respects. A conical shaped member allows a single lubricating tool to fit a large range of size openings in the hub. The exterior conical shape of the lubricating tool automatically centers the lubricating tool on the hub.

It is to be understood that the invention described herein is not limited by specific dimensions of the conical base member. A specific embodiment for illustrative purpose only may have physical dimensions as follows: base of the conical shaped member may be from about 2 to about 6 inches in diameter, conical section height may vary from about 1 inch to about 6 inches in height, the cylindrical opening through cone section from about 0.66 inch to about 2.5 inches in diameter, the diameter at the section perpendicular to the axis of the cone may be from about ¾ inch to about 4 inches, and consequently the cone angle 55 (see FIG. 3) may vary between about 30° and about 70°. Preferably the cone angle will be between 40° and 60° with the preferred embodiment having a cone angle between 50° and 60°. The wall thickness of the frusto-conical member is not critical so long as the wall thickness will support a lubricant passageway.

As shown in FIG. 2, a disk brake mechanism housing 7 covers the moving parts of the brake mechanism. The brake ring 9 rotates when the vehicle is moving. Inboard shoe 11 and outboard shoe 13 are positioned on each side of brake ring 9. The brake linings or pads 15 are attached to the inner surfaces of the inboard 11 and outboard 13 shoes. When the brake pedal is applied, the brake linings or pads firmly grip the outer flat surfaces of the revolving brake ring 9, thus slowing the vehicle.

Support member 21 and steering knuckles 19 are attached to the vehicle in conventional manner (not shown). Positioned on the spindle 23 is the inner bearings 31. The inner bearings and spindle being shown in phantom. The spindle 23 may be cylindrical or tapered as shown. The outer bearing having been removed in order to place the lubricating tool thereon. A nut 25 (shown in phantom) holds the lubricating device in operational relationship to cylindrical member 33. The opening in the cylindrical member or hub 33 may vary in size from vehicle to vehicle. The inner bearing 31 is positioned in operational relationship with the spindle 23 in a bearing recess 35 provided in wheel hub 37. A wheel rim (not shown) is adapted to fit over studs 29.

Figure 3:
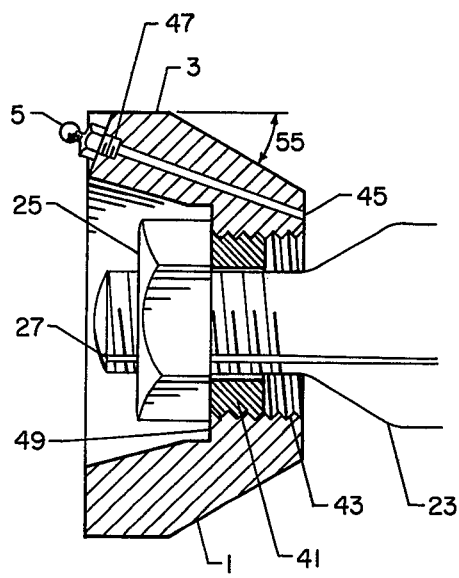
FIG. 3 is a section through another embodiment of the open-ended, frusto-conical shaped lubricating device having an annular member threadedly fitting the interior of the lubricating device.

Referring now to FIG. 3, in this embodiment, in section, there is shown a lubricant passageway 45 through the solid portion of the conical member 1 extending from the small diameter end to the large diameter end. In this embodiment the grease or lubricant passageway 45 is threaded as at 47 to receive grease fitting 5. The grease fitting may be the so-called "Zerk" grease fitting or other grease fittings as desired. For example, see U.S. Pat. No. 2,604,958. As illustrated, the grease fitting 5 is removable. It is clear however that the grease fitting may be made an integral part of the conical member without departing from the scope of the invention. In the opening of the conical member 1 there is a threaded annular insert 41 positioned in the generally cylindrical opening in the lubricating tool. The lubricating device is threaded as at 43 to receive the annular insert 41. A number of exteriorly thread annular inserts 41 of various size openings may be provided to fit different size spindles found on vehicles. Thus the lubricating device is universal in nature in that it is adapted to fit different sized spindles as well as different sized hubs. A nut 25 abutting shoulder 49 and annular insert 41 is adapted to hold the lubricating tool tightly on the spindle 23 and abutting hub 33. The angle of the cone forming the frusto-conical member is indicated by number 55 and may vary from about 30° to 70° as discussed above.

Figure 4:
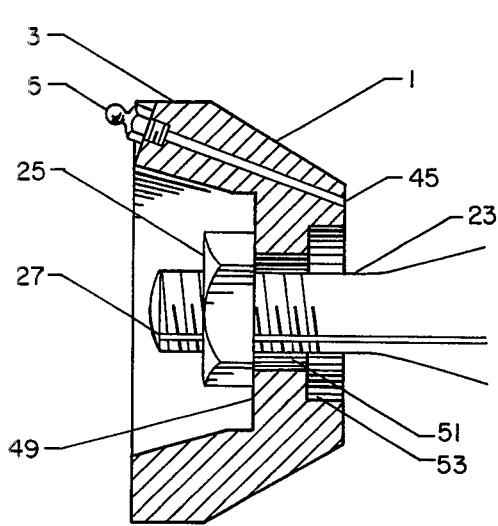
FIG. 4 shows another embodiment of the lubricating device.

In FIG. 4 another embodiment of the lubricating device 1 is illustrated. The annular base 3 of the conical member and the grease fitting 5 in operational relationship to the grease passageway 45 are essentially as illustrated in FIG. 3. The embodiment of FIG. 4 is provided with a recessed opening 51 through the interior thereof providing an interior annular ledge 53 or shoulder to receive spindles 23 of various sizes. The lubricating device of FIG. 4 is provided with a shoulder 49 against which the nut 25 abuts holding the lubricating device 1 in tight fit with the spindle 23.

To use the lubricating device of this invention, it is not necessary to remove the wheel from the vehicle. For purposes of clarity, however, FIG. 2 is shown without the wheel. The wheel cover or hub cap is first removed; then the dust cover, cotter pin and nut 25 are removed in that order. The outer bearing assembly (not shown) is then removed from outer bearing recess 35 around the spindle 23. The lubricating tool is slid over the spindle 23 in such a manner that the interior grease fitting opening 45 is opposite the keyway 27 in the spindle. Using the spindle nut 25, the nut is tightened against the shoulder 49 of the lubricating device to form a tight seal between the conical surface 2 and the wheel hub 33 and between the nut 25 and the shoulder 49. Upon tightening the nut 25 the conical shape 2 of the lubricating tool 1 self-centers with respect to the hub 33 and the spindle 23. Once the lubricating device is in position, lubricant is pumped into the grease fitting 5 through the lubricant passageway 45 until the annular space around the spindle 23 in the hub 33 is full. The mechanic will know when the lubricant starts to exude from the keyway 27 in the spindle that the hub is substantially full of grease. At this point the operator plugs the keyway 27 and pumps the grease gun one or more times to insure that the inner bearing 31 is substantially packed with lubricant. The keyway plug is removed. The spindle nut 25 is loosened and removed and the lubricating tool is removed. The outer bearing is lubricated and replaced in outer bearing recess 35. The spindle nut 25 is then replaced and tightened to the proper torque. The cotter pin and dust cover are replaced. Thus it is seen that the inner bearing, as well as the outer bearing, is easily lubricated without disassembly of the brake mechanisms.

From the foregoing it will be seen that this invention is one well adapted to obtain all ends and objects hereinabove set forth, together with other advantages which are obvious and which are inherent to the apparatus described. It will be understood that certain features and sub-combinations are of utility and may be employed without reference to other features in sub-combinations. This is contemplated by and is within the scope of the appended claims.

As many embodiments may be made of the invention without departing from the scope thereof, it is to be understood that all matter herein set forth or shown in the accompanying drawings is to be interpreted as illustrative and not in a limiting sense.

The invention having been described what is claimed is:

1. A tool for lubricating a bearing in place, comprising, an open ended member having a frusto-conical exterior surface, said member abutting an annular base at the largest diameter of said member, said member having a cylindrical inner surface, said inner surface adapted to be positioned in an annular spaced relationship to a spindle on which said bearing is positioned, a lubricant passageway at an acute angle to the longitudinal axis of the member, said passageway extending from the outer end surface of the small diameter end of said member to the largest diameter end of said member and terminating in said annular base, said lubricant passageway generally parallel to said frusto-conical exterior surface, and a grease fitting attached to said passageway in said annular base.

2. The tool of claim 1 including an integral interior annular ledge adjacent to the smallest diameter end of said member.

3. The tool of claim 1 wherein the interior of said member is threaded to receive an exteriorly threaded annular insert.

4. The tool of claim 3 including a removable exteriorly threaded annular insert positioned in the threaded interior of said member adjacent the smallest diameter end of said member.

5. The tool of claim 1 wherein the angle forming said frusto-conical surface is from about 30° to 70°.

6. A tool for lubricating a bearing mounted on a spindle in a bearing recess without removing said bearing from said recess or spindle comprising:
 a. an annular base member;
 b. a frusto-conical shaped member abutting said annular base member at the largest diameter of said frusto-conical shaped member and having a common opening through both said members, an internal annular ledge in said opening intermediate said annular base and the smallest diameter end of said frusto-conical member, said ledge formed by a recessed cylindrical opening in said smallest diameter end of said frusto-conical shaped member and a recessed opening in said annular base;
 c. a lubricant passageway in said frusto-conical shaped member extending from said small diameter end of said frusto-conical member to the large diameter end of said frusto-conical member and terminating in outer end surface of said annular base, and d. a grease fitting attached to said passageway in said annular base adjacent large diameter end of said frusto-conical member.

7. The tool of claim 6 werein the angle forming said frusto-conical member is from about 30° to about 70°.

* * * * *